(12) United States Patent
Corby, Jr.

(10) Patent No.: US 6,286,227 B1
(45) Date of Patent: Sep. 11, 2001

(54) MICROMETER SYSTEM AND PROCESS OF USE THEREFOR

(75) Inventor: Nelson Raymond Corby, Jr., Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/128,586

(22) Filed: Aug. 3, 1998

(51) Int. Cl.[7] ........................................................ G01B 3/18
(52) U.S. Cl. ................................................................ 33/813
(58) Field of Search ........................ 33/504, 542, 542.1, 33/558, 561, 792–795, 783, 784, 813, 814, 809, 810–811, 818–821, 827, 556, 557, 559; 702/151, 155, 165

(56) References Cited

U.S. PATENT DOCUMENTS

| | | | |
|---|---|---|---|
| 3,186,093 | * | 6/1965 | Binder ..................................... 33/815 |
| 3,805,393 | * | 4/1974 | Lemelson ................................ 33/813 |
| 4,103,427 | * | 8/1978 | Ledley, III ............................. 33/166 |
| 4,335,516 | * | 6/1982 | Edelstein ................................ 33/166 |
| 4,547,970 | * | 10/1985 | Brewster ................................ 33/167 |
| 4,677,755 | * | 7/1987 | Iwano et al. .......................... 33/504 |
| 4,736,313 | * | 4/1988 | Nishimura et al. ................... 33/813 |
| 5,012,685 | * | 5/1991 | Lackman ............................... 33/783 |
| 5,088,207 | * | 2/1992 | Betsill et al. ......................... 33/783 |
| 5,168,458 | * | 12/1992 | Gones .................................... 33/784 |
| 5,287,631 | * | 2/1994 | Stade ..................................... 33/820 |
| 5,408,758 | * | 4/1995 | Mizutani et al. ..................... 33/504 |
| 5,926,781 | * | 7/1999 | Scott ................................... 702/151 |
| 6,026,351 | * | 2/2000 | Takeuchi ............................. 702/155 |

\* cited by examiner

Primary Examiner—Diego Gutierrez
Assistant Examiner—Yantza Guadalupe
(74) Attorney, Agent, or Firm—Jean K. Testa; Donald S. Ingraham

(57) ABSTRACT

A micrometer system includes a motorized drive for repeatedly advancing and retracting the micrometer barrel, and a touch sensor for sensing when the barrel tip has just touched the target surface. The drive is preferably mounted on the micrometer body. By performing a measurement repeatedly, a series of readings can be obtained which cumulatively increases measurement accuracy, especially when contact must be made to a compliant surface.

12 Claims, 3 Drawing Sheets

MICROMETER SYSTEM AND PROCESS OF USE THEREFOR

BACKGROUND OF THE INVENTION

1. Field of the Invention

This invention relates to distance measuring apparatus and, more particularly, to a micrometer system and a process for its use.

2. Discussion of the Prior Art

A micrometer measures distance between two points on an object. Heretofore, manually operated micrometers have required considerable skill, experience and practice in order to accurately measure specimens. In addition, reading a micrometer can be difficult when it is necessary to manually record the measured value. Accordingly, the use of manually operated micrometers is error prone.

In manufacturing operations, it is often necessary to make many hundreds of precise micrometer measurements on a device being serviced or studied. Two common forms of micrometers are the outside type (with the familiar "P" shaped frame) and the inside micrometer (essentially a rod of accurately known length with an extendible micrometer spindle fitted to the end). One part of the micrometer is fixed and the other part can be made to move toward or away from the fixed part through use of a manually rotated barrel that advances or retracts a threaded section. Each revolution of the barrel usually advances or retracts the moveable part by a predetermined amount. In standard non-metric micrometers, a common increment is 0.025 inches per revolution. Engraved markings on the micrometer handle enable the user to determine how far the parts have opened or closed.

A variation of the micrometer is the vernier caliper. In this device, one jaw is made to slide toward or away from a fixed jaw and an accurately engraved linear scale is read to measure the jaw opening.

To illustrate the difficulties of manual measurement, consider the task of measuring the diameter of a rod. The operator uses an outside micrometer and opens the parts sufficiently to clear the rod, inserts the rod crosswise, and then rotates the micrometer barrel to close the parts to a position where the parts just contact the surface of the rod. In addition, the operator must ensure that the micrometer is applied to the widest point of the rod and is held perpendicular to the axis of the rod. An inside micrometer would be used to measure the diameter of a hole in a similar way.

If both the object being measured and the micrometer frame are rigid or noncompliant, then the measurement process of advancing the micrometer parts until they "just touch" the surface is straightforward. As soon as the parts touch the surface, it becomes impossible to advance the moveable part any further. If (as is usually the case) the micrometer frame or the object surface has some compliance, then considerable skill (or "touch") is required to determine that the parts are "just touching" the surface but not deforming the surface.

One particular situation arises frequently when making measurements on large objects or machines such as steam turbines and electric generators. For apparatus of this type, a "tight wire" measurement is often used. A thin wire is tightly stretched across some part of the object, usually in a way that the ends of the wire touch the object with the center of the wire being unsupported. The wire thus forms a reference datum line against which specified distances are to be measured. The wire always has a fair amount of compliance since it is only possible to tighten the wire a limited amount, before it snaps.

Using an inside micrometer which typically includes a fixed segment and an adjustable segment, the operator selects an appropriate fixed segment from a set of rod-like threaded sections of accurately known length. The operator then assembles the fixed and adjustable segments together to form a rod of known fixed length, slightly shorter that the length to be measured. The adjustable section includes a micrometer head or barrel and adjustable spindle (with perhaps 0–2 inches of travel). The micrometer head or "head" is screwed onto the fixed section, yielding a device to measure length from L to L+2 inches. L can be in the range of 10–15 feet.

The fixed end of the micrometer is placed against a portion of the object, for example, the frame of a turbine, and the movable end is positioned near the tight wire. The operator positions the moveable end of the inside micrometer so that it "just touches" the wire. This cannot be done by touch since the wire is very compliant. It is often impossible to detect the displacement of a wire until a large error (e.g., 0.020–0.040 inches) has occurred. To overcome this problem, an electrical circuit is often employed that generates a tone when the metal micrometer tip touches the metal wire and thus completes an electrical circuit. Sometimes a visual indication (e.g., a lamp or light emitting diode) is employed instead of a tone. By slowly advancing the micrometer tip while sweeping the tip back and forth in a small arc, the operator just barely causes electrical contact to be made. The micrometer is then read by the operator. This procedure must be repeated a number of times to be sure that the minimum distance has been measured. The process is thus both cumbersome and error prone.

There is, therefore, need for a device that can automatically advance the micrometer tip in such a way that the tip is made to "just touch" the tight wire. When the micrometer "just touches" the wire, the device should electronically "read" and store the micrometer reading. Such device also should automatically repeat the cycle a number of times to allow the manually held micrometer to be positioned so as to obtain a true reading. The device should then transfer the reading to a computer, if desired.

SUMMARY OF THE INVENTION

In accordance with a first general aspect of the invention, an apparatus is provided comprising a first member or probe adapted to make contact to a first point; a second member or probe adapted to make contact with a second point; a controller to automatically and repeatedly advance and retract the first member relative to the second member; and a contact detector to detect when the first member contacts the first point as the first member is automatically advanced and retracted. This first aspect of the invention constitutes a micrometer which measures distance between two points with great accuracy, detects contact between the micrometer tip and a reference datum, such as a wire, with greater accuracy then previously deemed possible, and eliminates the manual trial and error processes which are prone to inaccuracies.

In a second general aspect of the present invention, a micrometer mechanism is provided comprising means for measuring the distance between two points; means for repeatedly advancing and retracting the means for measuring; and means for determining when the means for measuring contacts the two points. The second general aspect provides the same advantages as the first aspect.

In a third general aspect of the invention, an apparatus is provided that is adapted for use with a measuring device having a member of known dimensions, and comprises: a probe; an automatic probe advancing and retracting mechanism operatively coupled to the probe; a coupling for attaching the automatic probe advancing and retracting mechanism to the measuring device; and a computation device to determine the distance between an end of the member and an end of the probe when the member and probe contact two points. This aspect provides the capability for adding to an existing micrometer system the ability to more accurately measure the distance between two points as with the first and second aspects.

In a final aspect of the invention, a method of measuring the distance between a first point and a second point comprises the steps of: providing a micrometer having a first member and a second member for contacting the first and second points, respectively; touching the second member to the second point; repeatedly advancing and retracting the first member as the micrometer is moved adjacent to the first point; determining when the first member contacts the first point; and determining the distance spanned by the first and second members at each instant when the first member contacts the first point. This method constitutes a more accurate process for measuring the distance between two points by eliminating the manual trial and error movement of a micrometer's movable point.

DESCRIPTION OF THE PREFERRED EMBODIMENTS

Figure 1:
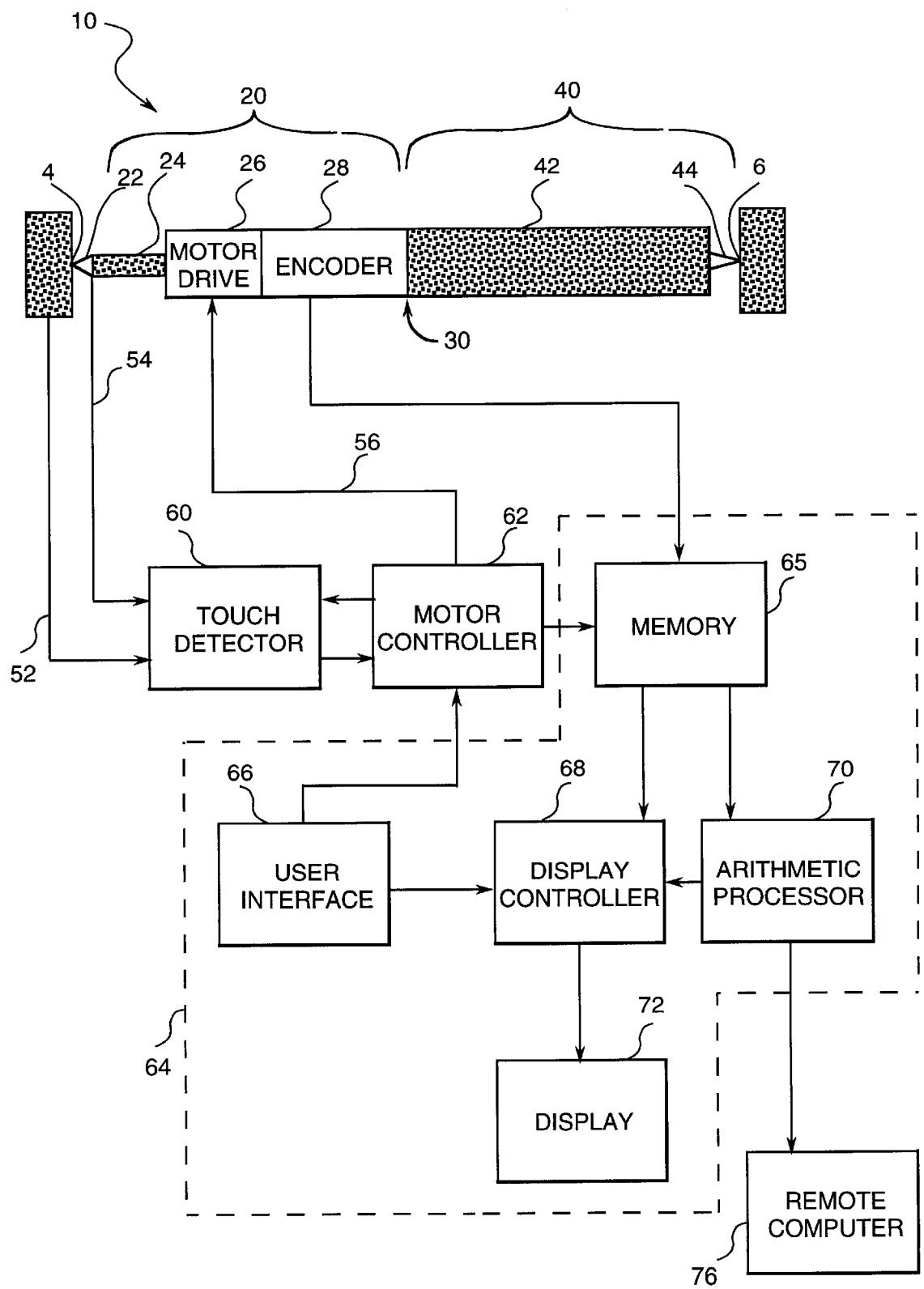
FIG. 1 is a block diagram illustration of a micrometer system including a micrometer and a removable micrometer head, in accordance with the invention.

FIG. 1 illustrates a micrometer system in accordance with a preferred embodiment of the invention. A micrometer 10 is shown to include a motorized micrometer head or barrel 20 and a member 40 of known length. In most inside micrometers (i.e., a micrometer that is between, and measures the distance between, two points), member 40 of known length can be interchanged with a member of another length, depending on the distance to be measured. Generally, member 40 includes a length of threaded rod 42 or like structure and a tip 44 to contact a normally noncompliant surface or second point 6 of the object being measured. Member 40 is then attached to a micrometer head/barrel with a manual spindle which can be advanced/retracted by the user.

Figure 2:
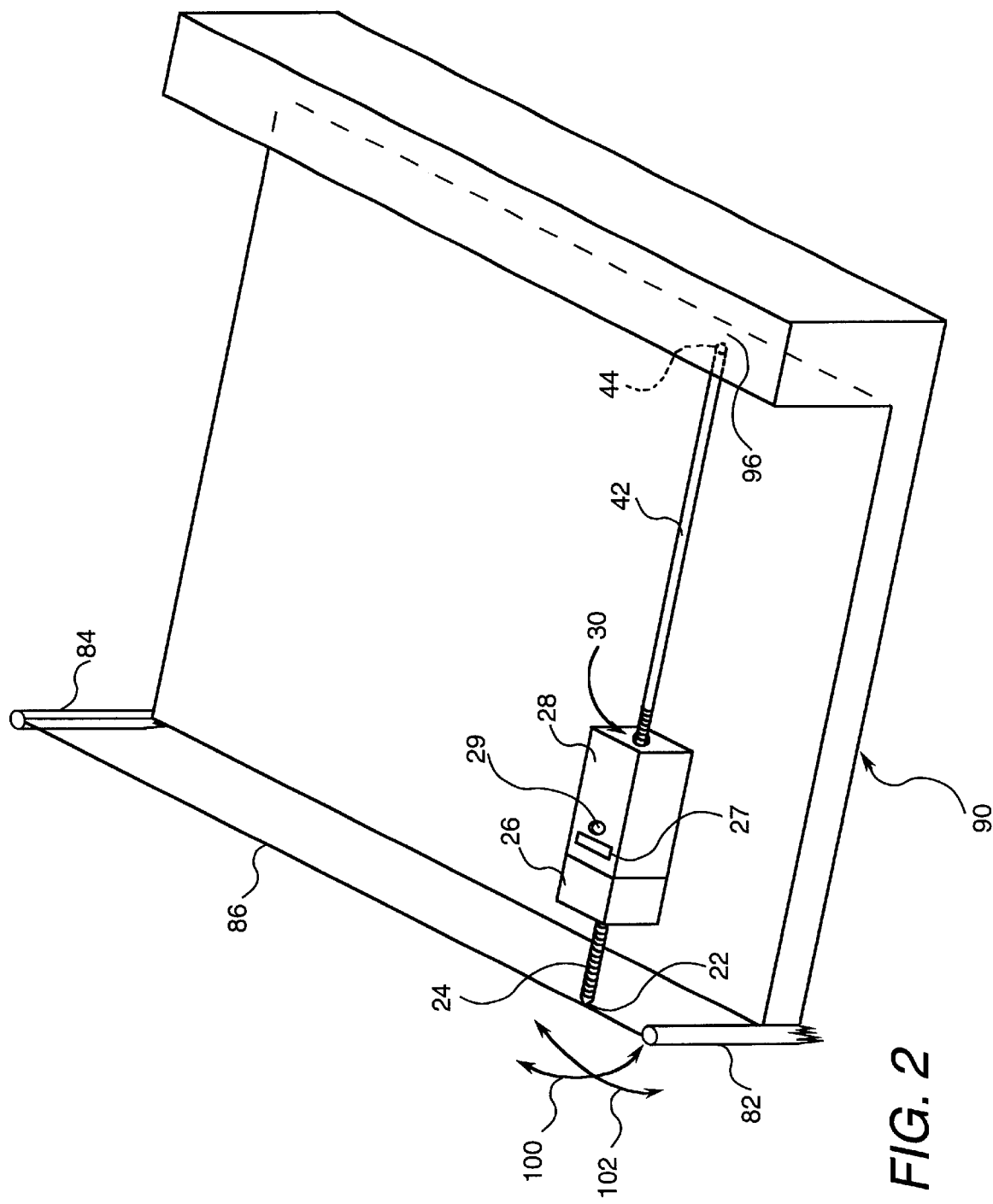
FIG. 2 is a schematic illustration of the micrometer of FIG. 1 in operation on a machine in accordance with an embodiment of the present invention.

The invention replaces the conventional manually driven micrometer head/barrel with a motorized head or barrel 20. Motorized head 20 includes a probe comprised of a spindle tip 22 on an end of an adjustable spindle or element 24. The distance by which element 24 extends from motorized head 20 can be controlled by a motor or motor drive 26 electronically coupled to a motor controller 62 by a lead wire 56. Motor controller 62, however, may preferably be mounted within the micrometer body. Motorized head 20 also includes an encoder 28 to measure the distance between tip 22 and tip 44 when a touch detector 60 senses spindle tip 22 "just touching" a possibly compliant target surface 4 at a first point. Micrometer head 20 may also include, as shown in FIG. 2, a digital display or readout 27 to display the measurement, and a start button 29 to begin an automatic measurement process to be discussed below.

Motorized head 20 is coupled to the member of known length 40 by a coupling 30 which can be any structure that assures the dimensional accuracy of member 40, e.g., a threaded connection, magnet or clamp.

Although the invention is described as an inside micrometer system, it is equally applicable to an outside micrometer (i.e., a micrometer that measures the distance between two points and is external of the two points). Further, the invention is not limited to a micrometer alone, as the micrometer head 20 is configured to be interchangeable with conventional micrometer systems having a set of members 40 already provided therein.

The invention may also include a touch detector system which can be provided by various devices. Most preferably, an electrical continuity system having a lead wire 54 from metallic micrometer tip 22 and a lead wire 52 from conductive surface 4 to a touch or contact detector 60 is used. Touch detector 60 can be any device for determining electrical continuity of the circuit, e.g., a multimeter. Alternatives to the electrical continuity system are, for instance, a force transducer tip whose output signal is proportional to compressive force; a "snap action" switch that switches once a prescribed force has been reached; various optical methods that rely on abrupt changes in the ratio of emitted to collected light when the micrometer tip contacts a surface; or air flow devices in which outflow of gas from the tip is halted when the tip contacts the target surface.

The invention may also include a computer system 64 which generally includes a memory 65, a user interface 66, a display controller 68, an arithmetic processor 70, and a display 72. The computer system may also be electronically coupled to a remote computer 76 for purposes that will be discussed below. Encoder 28, touch detector 60 and motor controller 62 are also interconnected with computer system 64 and each other for controlled operation.

The method of measuring the distance between a first and second point of an object is exemplified in FIG. 2. In this example, an object 90 includes a first point in the form of a wire 86 strung between two posts 82, 84 such that wire .86 is precisely positioned over the edge of object 90. Wire 86 takes the place of an object surface 4 (shown in FIG. 1) where the object 90 does not lend itself to such measurement. Alternatively, wire 86 could be strung between two parts of the object such that the center of the wire is unsupported.

The method of measuring includes providing a micrometer a having a first member 24 and tip 22, and second member 42 and tip 44, and contacting tip 44 of second member 42 to the second surface or point 96. The operator presses a "start" button 29 provided on the micrometer (or on user interface 66 shown in FIG. 1), that causes motor controller 62 (FIG. 1) to drive motor 26 to fully retract micrometer spindle 24. Controller 62 (FIG. 1) then causes spindle 24 to advance until touch detector 60 (FIG. 1) determines that spindle tip 22 has "just touched" wire 86 (or surface 4 as shown in FIG. 1). Simultaneously, the operator moves micrometer head 20 in accuate paths 100, 102, up and down and side-to-side, respectively, near wire 86 to assure that spindle tip 22 contacts wire 86. When touch detector 60 (FIG. 1) determines that a touch has occurred, encoder 28 measures the distance between spindle tips 22 and 44. The measurement value is stored in memory 65 (FIG. 1) and can be displayed on micrometer head display 27 and/or the computer system display 72 (FIG. 1). Alternatively, the measurement can be sent to remote computer 76 (FIG. 1) for further review and processing. Spindle tip 22 is then retracted by motor 26 for another cycle. Each cycle is complete when touch indicator 60 (FIG. 1) determines that spindle tip 22 just touches wire 86. The advance/touch/store/retract cycle is repeated as many times as the operator desires or as directed by computer system 64 of FIG. 1.

Figure 3:
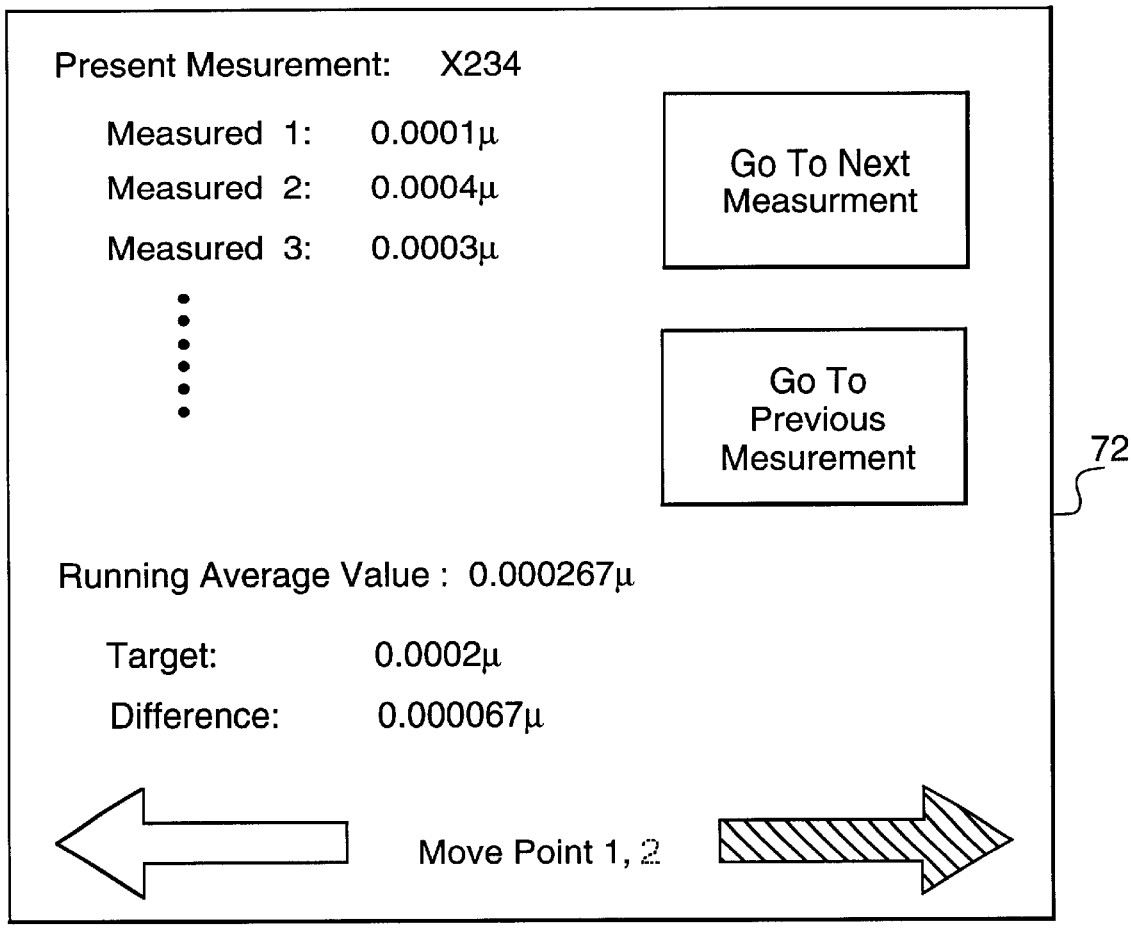
FIG. 3 illustrates a sample display for use with the micrometer system of the invention.

With reference to FIG. 2, as the measurement process progresses, computer system 64 (or remote computer 76) may provide a variety of feedback and control to the user. For instance, an exemplary display 72 is shown in FIG. 3. In this example, the display provides the user with the "present measurement" under investigation. Computer system 64 can also provide to the operator a number of preset measurements required to be taken for a given object. The operator can then provide a preset number of measurement cycles, e.g., five, for each required measurement as directed by computer system 64. When the preset number of cycles is complete for a required measurement, the operator can select "Go To Next Measurement" to proceed with the process. By selecting "Go To Previous Measurement" the operator can go back to repeat a previous measurement.

In terms of the display, after each cycle or a desired number of cycles, arithmetic processor 70 may compute operator selected output readings, e.g., minimum of all readings, maximum of all readings, running average (e.g., mean of all readings), etc., and supply these computed values to memory 65 or remote computer 76 for storage and/or review. The readings can be displayed on micrometer head display 27 (FIG. 2) or computer system display 72, as display size permits.

Computer system 64 can also provide a target distance with an error indication. The error indication can provide, for example, a difference value and a direction in which a given point, e.g., the first point at wire 86 (FIG. 2), must move so that the operator can machine the object accordingly. It is important to note, however, that the error indications provided are merely exemplary, as a variety of other indications can be given, e.g., an increase/decrease distance indication.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. An inside micrometer system comprising:
  a micrometer head including:
    a first probe adapted to make contact with a first point, and
    a motor drive attached to said first probe;
  a second probe attached to said micrometer head and adapted to make contact with a second point, said first and second probes being aligned in the configuration of a rod;
  a controller for repeatedly advancing and retracting the first probe relative to the second probe;
  a contact detector to detect when the first probe contacts said first point as the first probe is advanced and retracted and the second probe is held in contact with said second point; and
  a computer for recording distances at which the first probe contacts the first point;
  the computer being adapted to maintain a running measurement value based on said distances and a target measurement value, based on a preset number and further including an error indicator to signal any difference between the running and target measurement values.

2. The system of claim 1, wherein the error indicator also includes a direction indicator to indicate at least one of the direction and distance that one of the probes must move to reach the target measurement value.

3. The system of claim 1, wherein the computer further includes a menu of prestored distances to measure for a given object.

4. A micrometer mechanism comprising:
  measurement means for measuring distance between only two points at any given time;
  driving means for repeatedly advancing and retracting the measurement means;
  detector means for determining when the measurement means contacts the two points; and
  a computer for recording the distance between the two points measured by the measurement means;
  said computer being adapted to maintain a running measurement valuebased on said distance and a target measurement value, and further including an error indicator to signal any difference between the running and target measurement values based on a preset number.

5. The micrometer mechanism of claim 4, wherein the driving means includes a motor.

6. The micrometer mechanism of claim 4, wherein the error indicator also includes a direction indicator to indicate at least one of the direction and distance that must be moved toward one of the two points to reach the target distance value.

7. A micrometer mechanism comprising:
  measurement means for measuring distance between only two points at any given time;
  driving means for repeatedly advancing and retracting the measurement means;
  detector means for determining when the measurement means contacts the two points; and
  a computer for recording the distance between the two points measured by the measurement means and maintaining a running measurement value based on said distance and a target measurement value based on a preset number, and further including an error indicator to signal any difference between the running measurement value and the target measurement value;
  said computer further including a menu of prestored distances to measure for a given object.

8. Apparatus adapted for use with a measuring system having a member of known dimensions, comprising:
  a probe, said member and said probe being aligned in the configuration of a rod;
  an advancing and retracting mechanism operatively coupled to the probe; and
  means coupling the advancing and retracting mechanism to the measuring system;
  said measuring system including processor means for determining distance between an end of the member and an end of the probe when the member and probe contact only two points, respectively, at any given time;
  the measuring system being adapted to gather and maintain a runningmeasurement value based on said distance and target distance value based on a preset number and further including an error indicator to signal any difference between a running and target distance values.

9. The apparatus of claim 8, wherein the advancing and retracting mechanism comprises a motor.

10. The apparatus of claim 8, wherein the error indicator also includes a direction indicator to indicate at least one of the direction and distance to one of the two points in order to reach the target distance value.

11. A method of measuring distance between a first and second point, comprising the steps of:

providing a micrometer having a first member and a second member to contact the first and second points, respectively, said first and second members being aligned in the configuration of a rod;

contacting the second member to the second point;

repeatedly advancing and retracting the first member as the micrometer is moved adjacent to the first point;

determining when the first member contacts the first point;

determining a distance spanned by the first and second members at each instant when the first member contacts the first point, maintaining a running measurement value based on said distance; comparing said running measurement value to a target measurement value based on a preset number; and providing an error indication when a difference between a signal on the running measurement value and the target measurement value is found during said comparing step.

12. The method of claim 11, further comprising the step of providing an indication of which direction the first member must move to reach a target distance.

* * * * *